United States Patent
Kamiya

(10) Patent No.: US 7,537,071 B2
(45) Date of Patent: May 26, 2009

(54) VEHICLE WHEEL DRIVING APPARATUS ARRANGING STRUCTURE

(75) Inventor: Toru Kamiya, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 9 days.

(21) Appl. No.: 11/714,395

(22) Filed: Mar. 6, 2007

(65) Prior Publication Data

US 2007/0209852 A1  Sep. 13, 2007

(30) Foreign Application Priority Data

Mar. 9, 2006  (JP)  ............................ 2006-064117

(51) Int. Cl.
*B60K 1/00*  (2006.01)
(52) U.S. Cl. .................. 180/65.51; 180/65.1; 180/65.5; 180/65.6; 180/55; 180/57; 180/60; 180/298; 180/5.51
(58) Field of Classification Search ................ 280/5.51; 180/65.1, 65.5, 65.6, 55, 57, 60, 298
See application file for complete search history.

(56) References Cited

U.S. PATENT DOCUMENTS

| | | | | |
|---|---|---|---|---|
| 1,743,751 A | * | 1/1930 | Baker | 310/83 |
| 2,039,513 A | * | 5/1936 | Baker | 180/65.5 |
| 3,675,730 A | * | 7/1972 | Kontranowski | 180/55 |
| 5,322,141 A | * | 6/1994 | Brunner et al. | 180/65.5 |
| 6,113,119 A | * | 9/2000 | Laurent et al. | 280/124.1 |
| 6,386,553 B2 | * | 5/2002 | Zetterstrom | 280/5.51 |
| 6,722,459 B1 | * | 4/2004 | Wendl et al. | 180/65.5 |
| 7,270,204 B2 | * | 9/2007 | Taniguchi et al. | 180/65.5 |
| 2003/0159866 A1 | * | 8/2003 | Claypole et al. | 180/65.5 |
| 2004/0007406 A1 | * | 1/2004 | Laurent et al. | 180/65.6 |
| 2005/0056471 A1 | * | 3/2005 | Kurata | 180/65.5 |
| 2006/0144626 A1 | * | 7/2006 | Mizutani et al. | 180/65.5 |
| 2006/0225931 A1 | * | 10/2006 | Kurata | 180/65.5 |
| 2007/0193791 A1 | * | 8/2007 | Komatsu | 180/55 |

FOREIGN PATENT DOCUMENTS

JP  2004-090822  3/2004
WO  WO 2004108443 A1 * 12/2004

* cited by examiner

*Primary Examiner*—Christopher P Ellis
*Assistant Examiner*—Jacob Meyer
(74) *Attorney, Agent, or Firm*—Carrier, Blackman & Associates, P.C.; Joseph P. Carrier; William D. Blackman

(57) ABSTRACT

A vehicle wheel driving apparatus arranging structure has a road wheel 27, a road wheel supporting member 71 connected to a vehicle body via a suspension 31 to support the road wheel 27, and a motor 72 rotating a road wheel side of the road wheel supporting member 71. A center of gravity of the motor 72 is disposed higher than a center C of the road wheel 27, a plurality of arms 32 to 36 which make up the suspension 31 are disposed to support the road wheel supporting member 71, at least one of the arms 32 to 36 is disposed higher than the center of the road wheel 27, and one end of the arm 32 which is disposed higher than the center C of the road wheel 27 is connected to a motor housing 93 of the motor 72.

3 Claims, 6 Drawing Sheets

VEHICLE WHEEL DRIVING APPARATUS ARRANGING STRUCTURE

BACKGROUND OF THE INVENTION

1. Field of the Invention

The present invention relates to a vehicle wheel driving apparatus arranging structure in which an axle of a road wheel and a rotational shaft of an in-wheel motor are disposed eccentrically with each other.

2. Description of Related Art

In recent years, on vehicles, techniques for disposing a motor inside a rim of a wheel have been under development in an attempt to simplify a power transmission apparatus from a power source to a wheel and enhance the power transmission efficiency. Since a vehicle wheel driving apparatus (in-wheel motor) like this is such as to drive a wheel which is a high load, an output torque is designed to be increased by reducing the rotational speed of the motor by a gear mechanism.

Consequently, vehicle wheel driving apparatus for practical use were not always such that an axle of a road wheel and a rotational shaft of a motor was caused to coincide with each other.

As a vehicle wheel driving apparatus arranging structure like this, there are known techniques in which an axle of a road wheel and a rotational shaft of a motor are disposed eccentrically with each other (refer to, for example, JP-A-2004-90822).

A technique disclosed in JP-A-2004-90822 will be described.

FIG. 6 is a diagram which describes a related basic configuration, and a vehicle wheel driving apparatus 200 is such that an upper arm 201, a lower arm 202 and a shock absorber 203 are caused to extend from a vehicle body side, an axle supporting member 204 is supported by the upper arm 201, the lower arm 202 and the shock absorber 203, a motor 205 is mounted on a supported side (housing side) of the axle supporting member 204, a rotational shaft of the motor 205 is connected to a shaft side of the axle supporting member 204, and a road wheel 208 made up of a wheel 206 and a tire 207 is mounted on the shaft side of the axle supporting member 204, and the motor 205 is disposed at the rear of the road wheel 208. In the figure, reference numeral 209 denotes an axle.

In the vehicle wheel driving apparatus 200 in which the axle 209 and the rotational shaft of the motor 205 are made eccentric with each other, however, the position of center of gravity of the road wheel 208 changes depending upon where the motor 205 is disposed in the wheel, whereby the magnitude of unsprung longitudinal oscillation of the road wheel 208 which is produced by an input from the road surface when the road wheel 208 runs over irregularities on the road surface or driving force from the motor. Consequently, when making the axle 209 and the rotational shaft of the motor 205 eccentric with each other, the motor 205 is desirably disposed in an optimum position of the wheel 206.

In addition, in the vehicle wheel driving apparatus 200, due to an increase in unsprung weight resulting from placing the motor in the wheel or realizing an in-wheel motor, the unsprung longitudinal oscillation of the road wheel 208, which is produced by an input from the road surface when the road wheel 208 runs over irregularities on the road surface or driving force from the motor 205, tends to be increased. Consequently, methods have been in need which can reduce effectively the unsprung longitudinal oscillation of the road wheel 208.

Namely, vehicle wheel driving apparatus arranging structures have been desired which allows a motor to be disposed in an optimum position in a wheel and which can reduce effectively the unsprung longitudinal oscillation of a road wheel.

SUMMARY OF THE INVENTION

In consideration of the fact that the position of center of gravity of the road wheel changes depending upon where the motor 205 is disposed in the wheel, whereby the magnitude of unsprung longitudinal oscillation of the road wheel which is produced by an input from the road surface when the road wheel runs over irregularities on the road surface or driving force from the motor, a problem that the invention is to solve is to provide a vehicle wheel driving apparatus arranging structure in which a motor is disposed in an optimum position in a wheel.

In addition, in consideration of the fact that unsprung load is increased by placing the motor in the wheel or realizing an in-wheel motor, another problem that the invention is to solve is to provide a vehicle wheel driving apparatus arranging structure which can reduce effectively the unsprung longitudinal oscillation of the wheel.

According to a first aspect of the invention, there is provided a vehicle wheel driving apparatus arranging structure, comprising:

a road wheel;

a road wheel supporting member;

a suspension member that comprises a plurality of support joints, and connects the road wheel supporting member to a vehicle body to thereby rotatably support the road wheel; and a motor that is connected to the road wheel supporting member and rotates a road wheel side of the road wheel supporting member, wherein a center of gravity of the motor is disposed higher than a center of the road wheel, and at least one of the support joints is disposed higher than the center of the road wheel so as to be connected to a motor housing of the motor.

According to a second aspect of the invention, as set forth in the first aspect of the invention, it is preferable that the support joint disposed higher than the center of the road wheel is disposed above or in the vicinity of a rotational shaft of the motor.

According to a third aspect of the invention, as set forth in the first aspect of the invention, it is preferable that the support joint disposed higher than the center of the road wheel is mounted on the motor housing via a bracket or directly.

According to a fourth aspect of the invention, as set forth in the first aspect of the invention, it is preferable that the support joint is provided on at least one of:

an end of an arm disposed so as to be inclined relative to a longitudinal direction of the vehicle body;

an end of an arm that holds the road wheel relative to a displacement in a longitudinal direction of the vehicle body; and an end of a suspension constituent member that holds the road wheel relative to the displacement in the longitudinal direction of the vehicle body.

According to a fifth aspect of the invention, as set forth in the first aspect of the invention, it is preferable that at least one of the plurality of support joints is disposed lower than the center of the road wheel, and thus disposed support joint is provided on at least one of:

an end of an arm disposed so as to be inclined relative to a longitudinal direction of the vehicle body;

an end of an arm that holds the road wheel relative to a displacement in a longitudinal direction of the vehicle body; and an end of a suspension constituent member that holds the road wheel relative to the displacement in the longitudinal direction of the vehicle body.

According to the first aspect of the invention, since the center of gravity of the motor is disposed higher than the center of the road wheel, the unsprung longitudinal oscillation of the road wheel can be reduced which is produced by an input from the road surface when the road wheel runs over irregularities on the road surface or driving force from the motor. In addition, since the plurality of support joints which make up the suspension are disposed to support the road wheel supporting member and at least one of these support joints is disposed higher than the center of the road wheel and is then connected to the motor housing of the motor, the unsprung longitudinal oscillation of the road wheel can be reduced further effectively. As a result, there is provided an advantage that the increase in ride feel and steering stability can be realized.

According to the second aspect of the invention, since the support joint disposed higher than the center of the road wheel is positioned above or in the vicinity of the rotational shaft of the motor, there are provided advantages that the vicinity of the center of gravity of the motor can be supported and that the unsprung longitudinal oscillation of the road wheel can be reduced effectively.

According to the third aspect of the invention, since the support joint disposed higher than the center of the road wheel is mounted on the motor housing via the bracket or directly, there is provided an advantage that the versatility in mounting the support joint can be increased.

According to the fourth aspect of the invention, since the support joint is made to constitute the end of the arm disposed in the longitudinal direction of the vehicle body in the inclined fashion or the arm made hold the road wheel relative to the displacement of the longitudinal direction of the vehicle body or the end of the suspension constituent member, the unsprung longitudinal oscillation of the road wheel can be reduced effectively, whereby there is provided an advantage that the increase in ride feel and steering stability can be realized.

According to the fifth aspect of the invention, since at least one of the plurality of support joints is disposed lower than the center of the road wheel and the support joint so disposed is made to constitute the end of the arm disposed in the longitudinal direction of the vehicle body in the inclined fashion or the arm made to hold the road wheel relative to the displacement in the longitudinal direction of the vehicle body or the end of the suspension constituent member, a synergetic effect between the support shaft and the support shaft which is disposed higher than the center of the road wheel can be expected. As a result, there is provided an advantage that the unsprung longitudinal oscillation of the road wheel can desirably reduced further.

DETAILED DESCRIPTION OF EXEMPLARY EMBODIMENTS OF THE INVENTION EMBODIMENTS

Figure 1:
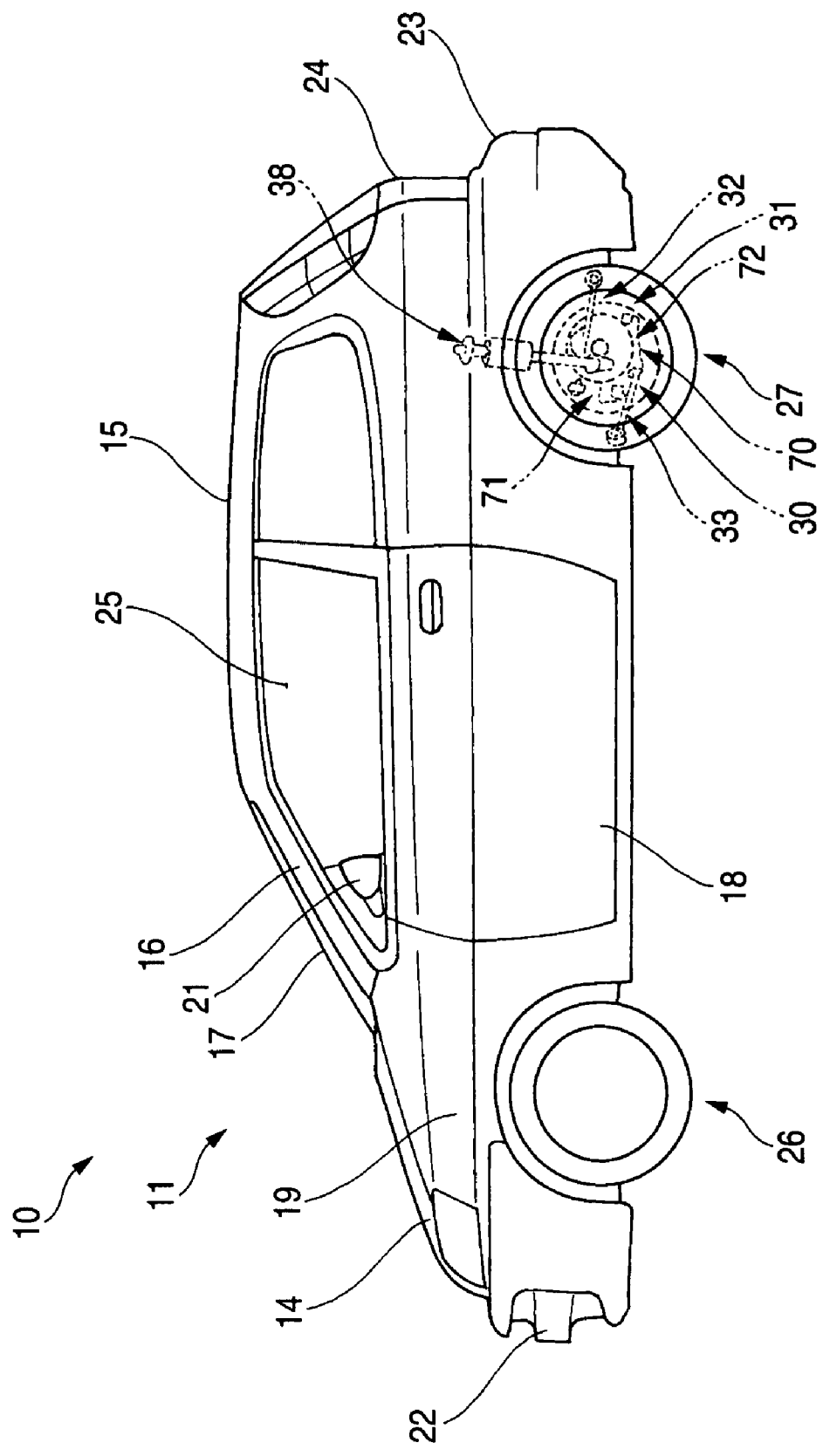
FIG. 1 is a side view of a vehicle which adopts a vehicle wheel driving apparatus arranging structure according to the invention.

Embodiment of the invention will be described below based on the accompanying drawings. Note that the drawings are to be seen in a direction in which the orientation of reference numerals becomes proper.

FIG. 1 is a side view of a vehicle which adopts a vehicle wheel driving apparatus arranging structure according to the invention, and in the figure, reference numeral 10 denotes a vehicle, 11 a vehicle body, 14 a bonnet or engine compartment hood, 15 a roof, 16 a front pillar, 17 a front side window, 18 a door, 19 a front fender, 21 an outside rearview mirror, 22 a front bumper, 23 a rear bumper, 24 a tailgate, 25 a passenger compartment, 26 a wheel, 27 a rear road wheel as a road wheel, and 31 a suspension.

The vehicle 10 is a fuel cell vehicle in which a fuel gas such as hydrogen is brought into chemical reaction within a fuel cell (not shown) to thereby generate electric current so as to supply electric current so generated to a motor (an electric motor) 72 for driving the vehicle, and a vehicle wheel driving apparatus (in-wheel motor) 70 is a apparatus which can dispose the motor 72 in an optimum position in the road wheel 27 and can reduce effectively the unsprung longitudinal oscillation of the road wheel 27.

Figure 2:
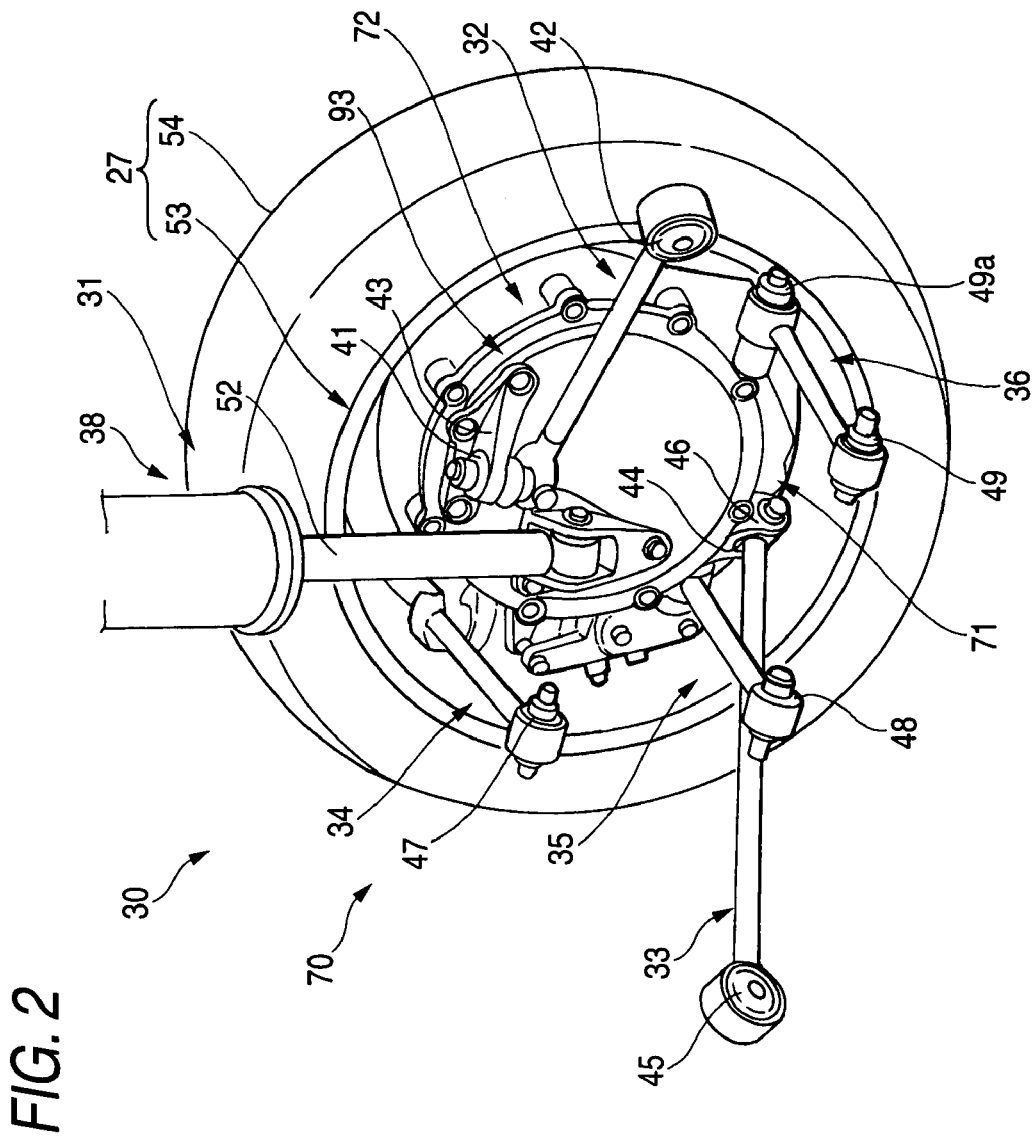
FIG. 2 is a perspective view of the vehicle wheel driving apparatus arranging structure according to the invention.

FIG. 2 is a perspective view of a vehicle wheel driving apparatus arranging structure according to the invention, and a vehicle wheel driving apparatus arranging structure 30 is a construction made up of the road wheel 27, the vehicle wheel driving apparatus 70 which is configured to be installed within the road wheel 27 to thereby drive the road wheel 27, and the suspension 31 which supports the vehicle wheel driving apparatus on the vehicle body side.

The suspension 31 includes a leading arm 32 which is an arm extended from a rear upper portion on the road wheel 27 side to the vehicle body 11 (refer to FIG. 1) side, a trailing arm 33 which is an arm extended from a front lower portion on the road wheel 27 side to the vehicle body 11 side, a front upper rod 34 which is an arm extended from a front lower portion on the road wheel 27 side to the vehicle body 11 side, a front lower rod 35 which is an arm extended from a front lower portion on the road wheel 27 side to the vehicle body 11 side, a rear lower rod 36 which is an arm extended from a rear lower portion on the road wheel 27 side to the vehicle body 11 side and a shock absorber 38 for mitigating impact applied to the road wheel 27.

The leading arm 32 includes an elastically deformable road wheel side support joint 41 which supports the road wheel 27 side at one end and an elastically deformable vehicle body side support joint 42 which is mounted on the vehicle body 11 (refer to FIG. 1) side at the other end thereof.

The road wheel side support joint 41 is such as to be connected to a motor housing 93 of the vehicle wheel driving apparatus 70 via a bracket 43 in such a manner as to freely oscillate (freely swing).

The trailing arm 33 includes an elastically deformable road wheel side support joint 44 which supports the road wheel 27 side at one end and an elastically deformable vehicle body side support joint 45 which is mounted on the vehicle body 11 (refer to FIG. 1) side at the other end thereof.

The road wheel side support joint 44 is such as to be connected to a mounting portion 46 of the vehicle wheel driving apparatus 70 directly and in such a manner as to freely oscillate (freely swing).

The front upper rod 34 includes an elastically deformable road wheel side joint (not shown) which supports the road wheel 27 side at one end and an elastically deformable vehicle body side joint 47 which is mounted on the vehicle body side at the other end thereof, the front lower rod 35 includes an elastically deformable road wheel side joint (not shown) which supports the road wheel 27 side at one end and an elastically deformable vehicle body side joint 48 which is mounted on the vehicle body side at the other end thereof, and the rear lower rod 36 includes an elastically deformable road wheel side joint 49*a* which supports the road wheel 27 side at one end and an elastically deformable vehicle body side joint 49 which is mounted on the vehicle body side at the other end thereof.

The shock absorber 38 includes a spring (not shown) for absorbing impact inputted in the road wheel 27 and a damper unit 52 for smoothing the vertical motion of the road wheel 27.

Figure 3:
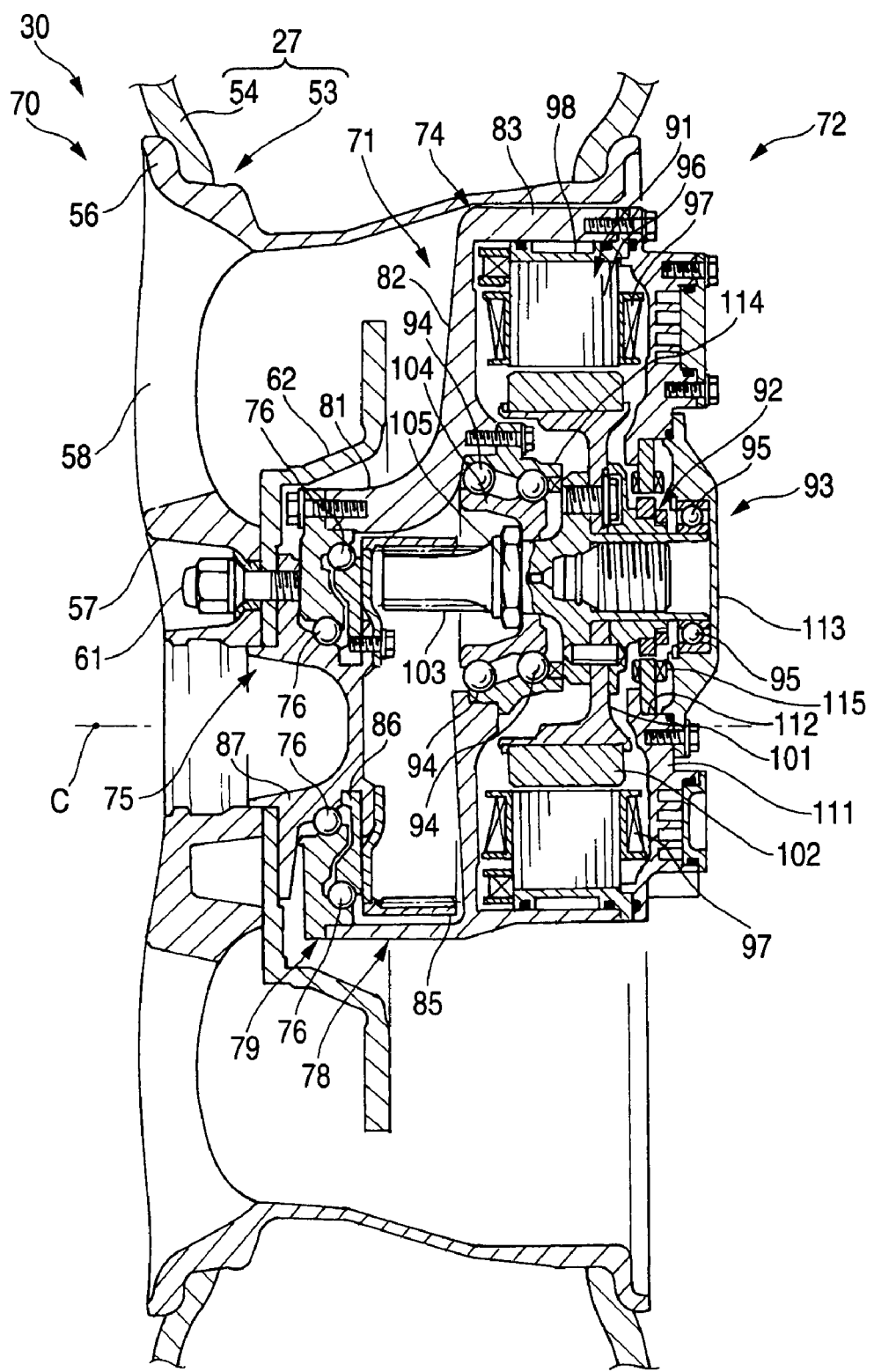
FIG. 3 is a sectional view of the vehicle wheel driving apparatus arranging structure according to the invention.

FIG. 3 is a sectional view of the vehicle wheel driving apparatus arranging structure according to the invention, and the road wheel 27 is made up of a wheel 53 which is mounted on the vehicle wheel driving apparatus side and a tire 54 which is mounted on this wheel 53.

The wheel 53 is made up of a rim portion 56 on which the tire 54 is mounted, a hub portion 57 which is provided at the center of the rim portion 56 and a disc portion (connecting portion) 58 which connects the rim portion 56 and the hub portion 57 together. In addition, reference numeral 61 denotes a bolt with which the road wheel 27 is mounted on a road wheel supporting member 71 of the vehicle wheel driving apparatus 70, and 62 a brake disc.

The vehicle wheel driving apparatus (in-wheel motor) 70 is made up of the road wheel supporting member 71 which supports rotatably the road wheel 27 and mounts the road wheel 27 on the vehicle body side and the motor 72 which is mounted on the road wheel supporting member 71 so as to drive the road wheel 27.

The road wheel supporting member 71 is made up of a supporting side member 74 which supports the road wheel 27 and the motor on the vehicle body 11 (refer to FIG. 1) side, a rotating side member 75 which is rotatably mounted on the supporting side member 74 via ball bearings 76 . . . ( . . . denotes plurality. This will be true hereinafter.) to thereby support rotatably the road wheel 27. Note that comparing the road wheel supporting member 71 to a relationship between a bearing and a shaft, the supporting side member 74 has a function corresponding to the bearing, whereas the rotating side member 75 has a function corresponding to the shaft.

The supporting side member 74 is a portion which constitutes a chassis of the vehicle wheel driving apparatus 70 and a member which doubles as part of the motor housing of the motor and includes a main body portion 78 and a road wheel side lid portion 79 which is mounted on the main body portion 78 so as to rotatably support the rotating side member 75.

The main body portion 78 is made up of a base portion 81 which covers the rotating side member 75, a disc portion 82, functioning as a front surface of the motor housing, which is caused to extend from the base portion 81 in an radially outwardly relative to a rotation axis of the motor so as to cover a front surface of the motor 72 and a cylindrical portion 83, functioning as an outer circumferential surface of the motor housing, which is caused to extend from the disc portion 82 along an axis of the motor so as to cover an outer circumference of the motor 72.

The rotating side member 75 is made up of a ring gear 85 which is brought into mesh engagement with a pinion 103 which is a rotational shaft of the motor 72 so as to receive driving force from the motor 72, a disc 86 which rotatably supports the ring gear 85 on the supporting side member 74, and a cylindrical hub 87 which is caused to project from the supporting side member 74 by assembling together the disc 86 and the ring gear 85. In addition, the cylindrical hub 87 is a member on which the road wheel 27 is mounted.

The motor 72 is made up of a stator 91, a rotor 92 which is mounted rotatably on the stator 91 via ball bearings 94 . . . , 95 . . . and the motor housing 93 which accommodates the stator 91 and the rotor 92 together.

The stator 91 is made up of a stator core 96 in which a plurality of iron plates are stacked together and coils 97 . . . which are wound round the stator core 96 and a stator ring 98 which supports the stator core 96 and the coils 97 . . . on the motor housing 93 side.

The rotor 92 is a member which is formed into peg-top shape and is made up of a rotor main body 101, a ring-shaped magnet 102 which is magnetized to a plurality of magnetic poles mounted on an outer circumference of the rotor main body 101, the pinion 103 which is caused to project integrally from the center of the rotor main body 101, a rotor side bush 104 which is mounted rotatably on the motor housing 93 side via ball bearings 94 . . . , and a nut 105 with which the rotor side bush 104 is mounted on the rotor main body 101.

The motor housing 93 is made up of the disc portion (the front surface of the motor housing) 82 which is formed integrally on the supporting side member 74 of the road wheel supporting member 71 as has been described before, the cylindrical portion (the outer circumferential surface of the motor housing) 83 which is formed similarly, a housing main body 111 which covers rear surfaces of the stator 91 and the rotor 92, a center plate 113 which covers a center opening 112 in the housing main body 111 and supports rotatably the rotor 92, and a housing side bush 114 which supports rotatably the rotor side bush 104 of the rotor 92. Note that reference numeral 115 denotes a resolver (detection sensor) for implementing magnetic pole position detection and rotation detection of the rotor 92.

Figure 4:
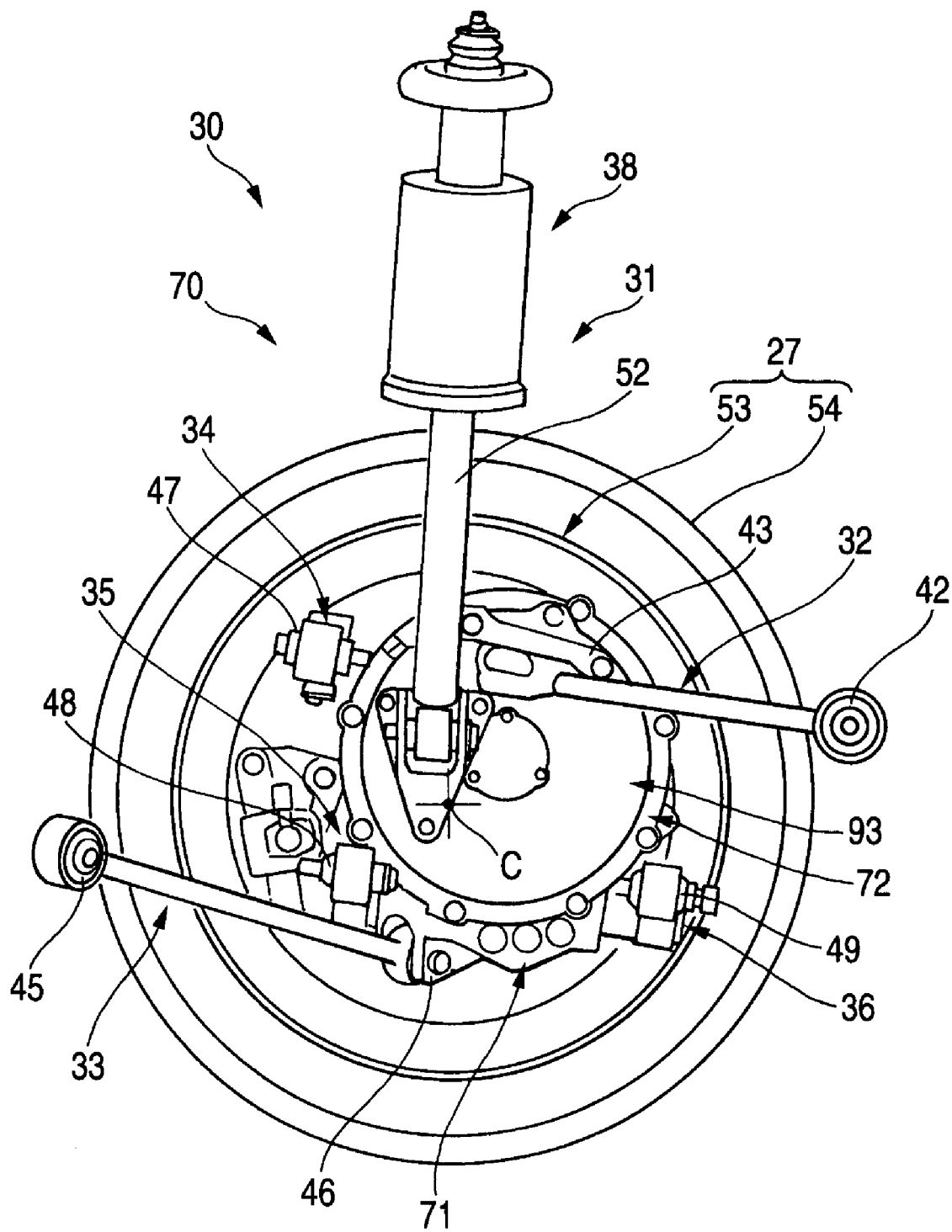
FIG. 4 is side view of the vehicle wheel driving apparatus arranging structure according to the invention.

FIG. 4 is a side view of the vehicle wheel driving apparatus arranging structure according to the invention, and the vehicle wheel driving apparatus arranging structure 30 is said to be a construction in which in the vehicle wheel driving apparatus which includes the road wheel (rear road wheel) 27, the road wheel supporting member 71 which is connected to the vehicle body via the suspension 31 so as to support rotatably the road wheel 27, and the motor 72 which is connected to the road wheel supporting member 74 so as to rotate and drive the road wheel 27 side of the road wheel supporting member 71, the center of gravity of the motor 72 is disposed higher than a center C of the road wheel 27, the plurality of support joints 41, 42, 44, 45, 47, 48, 49, 49*a* which make up the suspension 31 are disposed to support the road wheel supporting member 71, at least one of the support joints 41, 42, 44, 45, 47, 48, 49, 49a is disposed higher than the center (axle) C of the road wheel 27, and one end of the arm (leading arm) 32 which is disposed higher than the center C of the road wheel 27 is connected to the motor housing 93 of the motor 72.

For example, in case the motor can be disposed in an optimum position in the wheel, it is preferable because the unsprung longitudinal oscillation of the road wheel which is produced by an input from the road surface when the road wheel runs over irregularities on the road surface or driving force from the motor can be reduced, and in case the unsprung longitudinal oscillation of the road wheel can be reduced by disposing the motor in the optimum position in the wheel, it is preferable in realizing the increase in ride feel and steering stability.

Namely, by disposing the center of gravity of the motor 72 higher than the center C of the road wheel 27, the unsprung longitudinal oscillation of the road wheel which is produced by an input from the road surface when the road wheel runs over irregularities on the road surface or driving force from the motor can be reduced.

In addition, by disposing the plurality of support joints 41, 42, 44, 45, 47, 48, 49, 49a which make up the suspension 31 to support the road wheel supporting member 71, disposing at least one of the support joints 41, 42, 44, 45, 47, 48, 49, 49a higher than the center C of the road wheel 27, and connecting one end of the arm (leading arm) 32 which is disposed higher than the center C of the road wheel 27 to the motor housing 93 of the motor 72, the unsprung longitudinal oscillation of the road wheel can be reduced further effectively. As a result, the increase in ride feel and steering stability can be realized.

In other words, when the motor 72 is seen from the axle direction, the vehicle wheel driving apparatus arranging structure 30 is said to be such that a portion thereof which shares more than a half of the stator 91 (refer to FIG. 3) of the motor 72 is positioned higher than the center C of the road wheel 27.

By positioning the portion which shares more than a half of the stator 91 (refer to FIG. 3) of the motor 72 higher than the center C of the road wheel 27, the unsprung longitudinal oscillation of the road wheel can be reduced effectively.

In addition, the vehicle wheel driving apparatus arranging structure 30 is said to be such that the support joint 41 (one end of the arm 32) which is disposed higher than the center C of the road wheel 27 is positioned above or in the vicinity of the rotational shaft (pinion) 103 of the motor 72.

By positioning the support joint 41 disposed higher than the center C of the road wheel 27 above or in the vicinity of the rotational shaft (pinion) 103 of the motor 72, the motor 72 can be supported in the vicinity of the center of gravity thereof, whereby the unsprung longitudinal oscillation of the road wheel can be reduced further effectively.

The vehicle wheel driving apparatus arranging structure 30 is said to be such that the support joint 41 (one end of the arm 32) which is disposed higher than the center C of the road wheel 27 is mounted on the motor housing 93 via the bracket 43.

By positioning the support joint 41 disposed higher than the center C of the road wheel 27 on the motor housing 93 via the bracket 43, the versatility in mounting the arm can be increased.

The vehicle wheel driving apparatus arranging structure 30 is said to be such that the support joints 41, 44 are made to constitute respective one ends of the arms 32, 33 which are disposed inclined in the longitudinal direction of the vehicle body or the arms 32, 33 which are made to hold the road wheel 27 relative to a displacement of a longitudinal direction of the vehicle body, or one ends of constituent members of the suspension 31.

By making the support joints 41, 44 constitute respective one ends of the arms 32, 33 which are disposed inclined in the longitudinal direction of the vehicle body or the arms 32, 33 which are made to hold the road wheel 27 relative to a displacement in the longitudinal direction of the vehicle body, or respective one ends of the constituent members of the suspension 31, the unsprung longitudinal oscillation of the road wheel can be reduced effectively, and the increase in ride feel and steering stability can be realized.

The vehicle wheel driving apparatus arranging structure 30 is said to be such that at least one of the plurality of support joints 41, 42, 44, 45, 47, 49, 49a is disposed lower than the center of the road wheel 27 and the support joint 44 is made to constitute one end of the arm 33 disposed inclined in the longitudinal direction of the vehicle body or the arm 33 made to hold the road wheel 27 relative to a displacement in the longitudinal direction of the vehicle body or one end of a constituent member of the suspension 31.

By disposing at least one of the plurality of support joints 41, 42, 44, 45, 47, 49, 49a lower than the center of the road wheel 27 and making the support joint 44 constitute one end of the arm (the trailing arm) 33 disposed inclined in the longitudinal direction of the vehicle body or the arm 33 made to hold the road wheel 27 relative to a displacement in the longitudinal direction of the vehicle body or one end of a constituent member of the suspension 31, a synergetic effect can be expected with the arm (the leading arm) 32 disposed higher than the center of the road arm 27. As a result, the reduction in unsprung longitudinal oscillation of the road wheel can be expected.

Figure 5B:
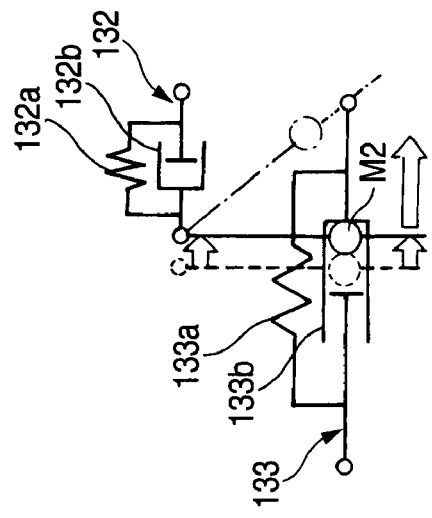
FIGS. 5B is a diagram which shows a vehicle wheel driving apparatus arranging structure of the comparison example.
Figure 5A:
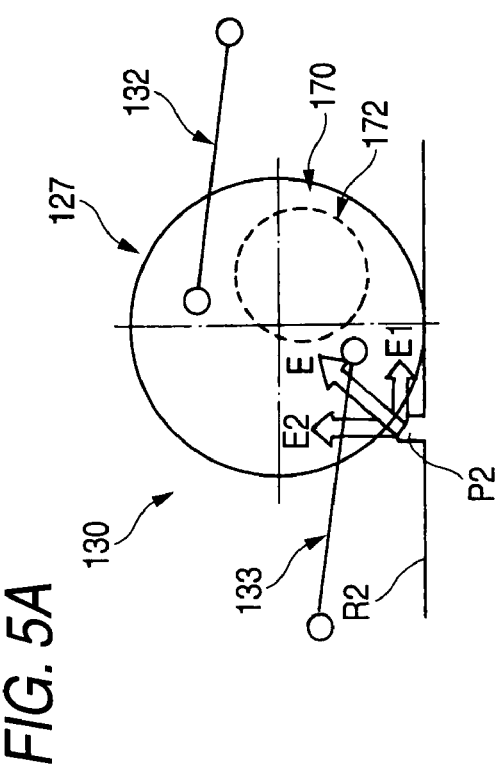
FIG. 5A is a diagram which shows a vehicle wheel driving apparatus arranging structure of the comparison example.
Figure 5D:
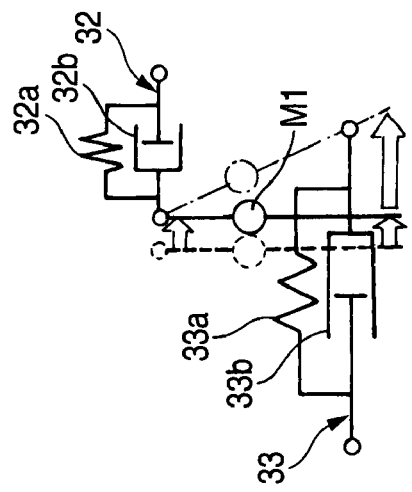
FIGS. 5D is a diagram which shows a vehicle wheel driving apparatus arranging structure of the invention.
Figure 5C:
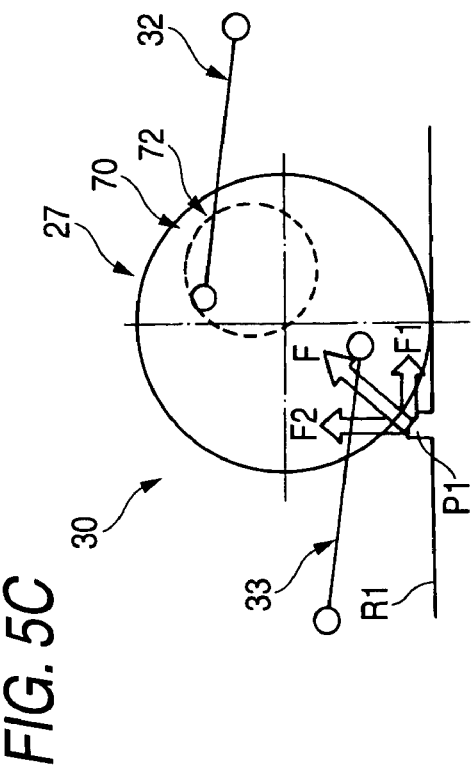
FIGS. 5C is a diagram which shows a vehicle wheel driving apparatus arranging structure of the invention.
Figure 6:
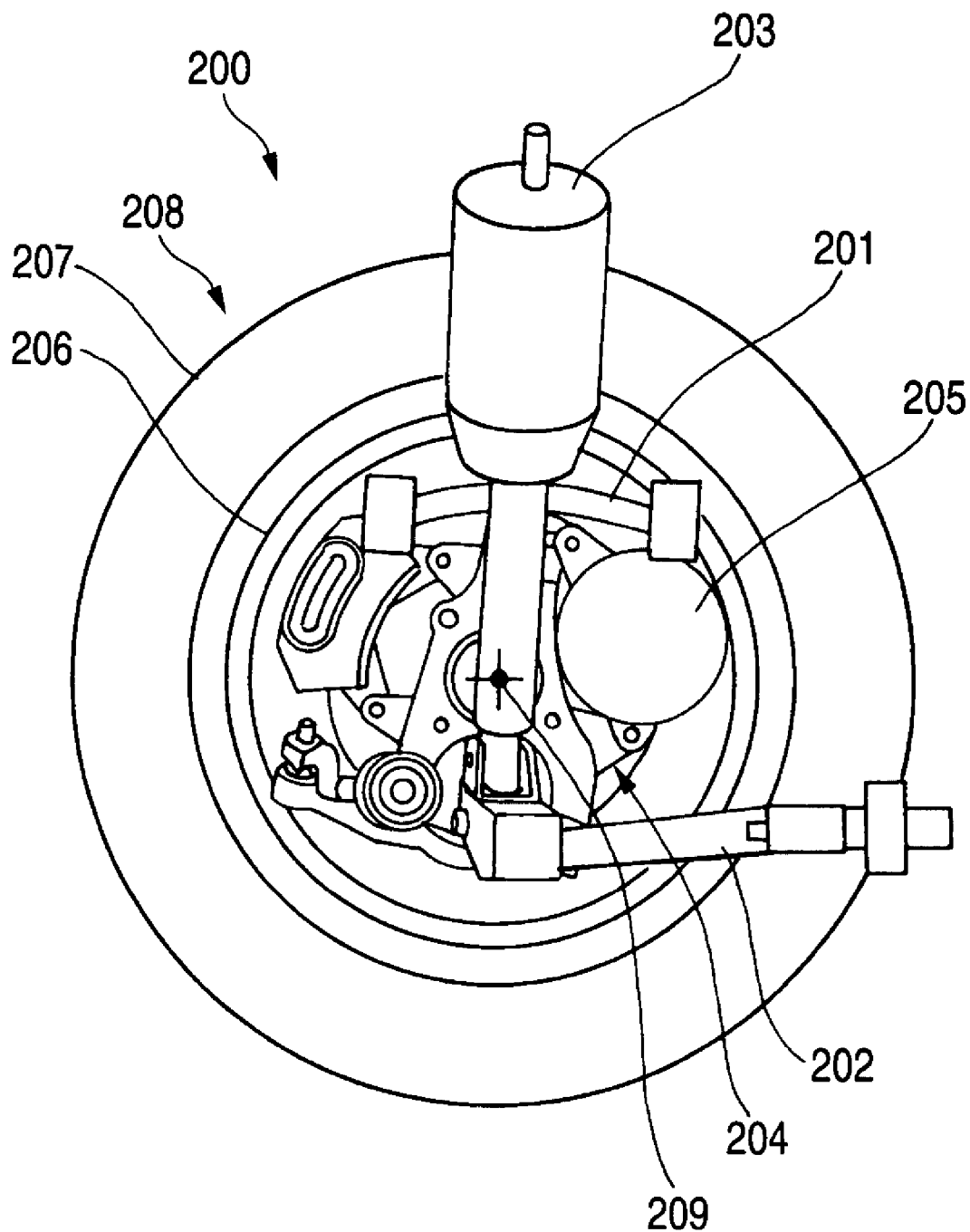
FIG. 6 is a diagram which described a basic configuration of a related vehicle wheel driving apparatus arranging structure.

FIGS. 5A to 5D are diagrams which study the vehicle wheel driving apparatus arranging structure according to the invention through comparison with a comparison example, in which FIGS. 5A, 5B show a vehicle wheel driving apparatus arranging structure 130 of the comparison example and FIGS. 5C, 5D show the vehicle wheel driving apparatus arranging structure.

In FIG. 5A, the vehicle wheel driving apparatus arranging structure 130 is such that the center of gravity of a motor 172 of a vehicle wheel driving apparatus (in-wheel motor) 170 is disposed lower than the center of a road wheel 127, a leading arm 132 is caused to extend from a rear upper portion on the road wheel 127 side to a vehicle body side (not shown), and a trailing arm 133 is cased to extend from a front lower portion on the road wheel 127 side to the vehicle body side.

As is shown in FIG. 5B, the leading arm 132 is such as to be connected to the road wheel side and the vehicle body side at ends thereof via elastically deformable support joints (not shown) and includes an elastic component 132a and a damper component 132b. In addition, the trailing arm 133 is such as to be connected to the road wheel side and the vehicle body side at ends thereof via elastically deformable support joints (not shown) and includes an elastic component 133a and a damper component 133b. M2 denotes a weight of the motor 72.

In FIG. 5A, assuming that when the road wheel 127 runs over a projection P2, a reaction force of E is applied to the road wheel 127, the reaction force E can be divided into a horizontal component E1 and a vertical component E2.

In FIG. 5B, mainly the horizontal component E1 is applied to the leading arm 132 and the trailing arm 133. In the vehicle wheel driving apparatus arranging structure 130, however, since the center of gravity of the motor 172 is disposed lower than the center of the road wheel 127, an impact that is to be absorbed by the trailing arm 133 is larger than an impact that is to be absorbed by the leading arm 132. Consequently, the trailing arm 133 needs, for example, an impact or shock absorbing member such as a bush having a high shock absorbing capability.

In FIG. 5C, the vehicle wheel driving apparatus arranging structure 30 is such that the center of gravity of the motor 72 of the vehicle wheel driving apparatus (in-wheel motor) 70 is disposed higher than the center of the road wheel 27, the leading arm 32 is caused to extend from the rear upper portion on the road wheel 27 side to the vehicle body 11 side, and the trailing arm 33 is caused to extend from the front lower portion on the road wheel 27 side to the vehicle body 11 side.

As is shown in FIG. 5D, the leading arm 32 is such as to be connected to the road wheel 27 side and the vehicle body 11 side at the ends thereof via the elastically deformable joints 41, 42 (refer to FIG. 2) and includes an elastic component 32a and a damper component 32b. In addition, the trailing arm 33 is such as to be connected to the road wheel 27 side and the vehicle body 11 side at the ends thereof via the elastically deformable support joints 44, 45 (refer to FIG. 2) and includes an elastic component 33a and a damper component 33b. M1 is a weight of the motor 72.

In FIG. 5C, assuming that when the road wheel 27 runs over a projection 1, a reaction force F is applied to the road wheel 27, the reaction force F can be divided into a horizontal component F1 and a vertical component F2.

In FIG. 5D, mainly, the horizontal component F1 is applied to the leading arm 32 and the trailing arm 33. In the vehicle wheel driving apparatus arranging structure 30, since the center of gravity of the motor 72 is disposed higher than the center of the road wheel 27, impacts that are to be absorbed by the trailing arm 33 and the leading arm 32 can be divided proportionally. Consequently, the service life of the support joints 41 to 44 (refer to FIG. 2) can be extended.

While in the vehicle wheel driving apparatus according to the invention, as is shown in FIG. 2, the one end of the arm (the leading arm) 32 which is disposed higher than the center of the road wheel 27 is mounted on the motor housing 93 via the bracket 43, the invention is not limited thereto, and hence, a configuration may be adopted in which the leading arm 32 is mounted directly on the motor housing at the one end thereof. By mounting the leading arm 32 directly on the motor housing 93, a reduction in weight of the vehicle wheel driving apparatus can be realized.

While the vehicle wheel driving apparatus according to the invention is described as including the suspension 31 which is made mainly up of the leading arm 32 and the trailing arm 33 as is shown in FIG. 2, the invention is not limited thereto, and hence, an arbitrary type of suspension can be adopted.

The vehicle wheel driving apparatus arranging structure according to the invention is preferably applied to a fuel cell vehicle in which a fuel gas such as hydrogen is brought into chemical reaction in a fuel cell.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle wheel driving apparatus arranging structure comprising:
   a road wheel;
   a road wheel supporting member;
   a suspension member that comprises a plurality of support joints, and connects the road wheel supporting member to a vehicle body to thereby rotatably support the road wheel; and
   a motor that is connected to the road wheel supporting member and rotates a road wheel side of the road wheel supporting member, wherein
   a center of gravity of the motor is located at a position higher than a center of the road wheel; and
   at least one of the plurality of support joints is disposed at a position higher than the center of the road wheel so as to be connected to a motor housing of the motor; and
   wherein at least one of the plurality of support joints is disposed at a position lower than the center of the road wheel, and thus disposed support joint is provided on at least one of:
   an end of an arm disposed so as to be inclined relative to a longitudinal direction of the vehicle body;
   an end of an arm that holds the road wheel relative to a displacement in a longitudinal direction of the vehicle body; and
   an end of a suspension constituent member that holds the road wheel relative to the displacement in the longitudinal direction of the vehicle body.

2. The vehicle wheel driving apparatus arranging structure according to claim 1, wherein the at least one of said plurality of support joints disposed at the position higher than the center of the road wheel is mounted on the motor housing via a bracket.

3. The vehicle wheel driving apparatus arranging structure according to claim 1, wherein the at least one of said plurality of support joints disposed at the position higher than the center of the road wheel is directly mounted on the motor housing.

* * * * *